3,379,671
Patented Apr. 23, 1968

3,379,671
RUBBERY COPOLYMERS WITH IMPROVED TACK
David M. Coddington, Dunellen, N.J., and Arnold E. Lipson, Canton, Ohio, assignors to Esso Research and Engineering Company, a corporation of Delaware
No Drawing. Filed Sept. 1, 1965, Ser. No. 484,441
11 Claims. (Cl. 260—33.6)

ABSTRACT OF THE DISCLOSURE

Rubbery copolymers of ethylene and higher alpha olefins are blended with Butyl rubber or Vistanex and process oil. The blended rubber shows greatly improved building tack without adverse effect on cure state.

---

This invention relates to rubbery copolymers of ethylene and higher alpha olefins. More specifically it relates to such compositions which have improved tack prior to vulcanization. Rubbery copolymers of ethylene and higher alpha olefins, such as propylene, are now known in the art. These copolymers can be used to produce tires, hoses, belts, sheeting, and other products of a similar nature. "Building" tack is a necessary characteristic in a rubber used in composite structures such as tires or hoses since the rubber must adhere to itself and other rubber compounds during fabrication in the uncured state and until it has been vulcanized. One disadvantage of these rubbers is their relative absence of tack. These copolymers also are often poor in their tack enhancement response to conventional tackifying resins.

It has now been found that the tackiness of rubbery copolymers of ethylene and higher alpha olefins is improved if the copolymer is blended with process oil and selected isoolefin polymers. This is surprising in view of the fact that the blended ingredients are themselves relatively non-tacky. The ingredients are blended on a conventional rubber mixing apparatus such as a rubber mill or a Banbury mixer.

More particularly, to 100 parts of the ethylene-higher alpha olefin copolymer is added by weight, about 30 to 250 parts of a petroleum oil and about 5 to 100 parts of the isoolefin based polymer. Preferably about 50 to 200 parts of process oil are used and about 10 to 70 parts of isoolefin based polymer. Optionally up to about 500 parts by weight of carbon black, preferably about 50 to 300 parts, may also be added to the blend. There may also be optionally added to the blend conventional tackifying resins such as wood rosin, pine tar, and phenolformaldehyde resins.

The rubbers which are tackified by this invention are substantially amorphous copolymers of ethylene and a $C_3-C_{12}$ alpha olefin such as propylene, butene-1, pentene-1, or octene-1. The $C_3-C_5$ alpha olefins are preferred as the comonomer with ethylene, and propylene is particularly preferred. These copolymers are produced by a low pressure process which is by now well known in the art, see for example Patent No. 3,000,866 issued on Sept. 19, 1961, and application No. 320,521, filed Oct. 31, 1963, now Patent No. 3,329,646.

The invention is also applicable to rubbers made from the above copolymers which additionally include a minor amount (about 2 to 10 wt. percent) of a third monomer. The third monomer is a nonconjugated diolefin added to make the product more readily curable. Examples of third monomers which may be added are 1–4 hexadiene, methylene norbornene, and dicyclopentadiene. Thus, the phrase "copolymer of ethylene and a higher alpha olefin" is meant to include the above-described terpolymers.

The isoolefin polymers which are blended with the rubber of this invention are Vistanex (polyisobutylene), Butyl rubber, or mixtures thereof. Butyl rubber is known in the art to be a copolymer of a major proportion of an isoolefin with a minor proportion of a multiolefin. More particularly, it is a copolymer of about 60–99.5% of a $C_4-C_8$ isoolefin, such as isobutylene, and about 40 to 0.5% of a $C_4-C_{14}$ conjugated multiolefin, such as butadiene or more preferably isoprene. Butyl rubber is a solid, and Vistanex ranges from a semisolid to a solid in consistency.

The process oils of this invention are also known in the art as "compatible oils" or "rubber extending oils." They are frequently derived from petroleum, are miscible in the rubber, and do not migrate to the surface of the final composition. These oils are more fully described in Patent No. 3,081,276, issued Mar. 12, 1963. The cited patent emphasizes the unexpected effects of the present invention insofar as it teaches that the addition of process oil to copolymers of ethylene and propylene *decreases* their tackiness.

Representative process oils and their specifications are shown below:

PROCESS OIL SPECIFICATIONS

| Class | Flexon 580 | Flexon 765 | Flexon 791 | Flexon 845 |
|---|---|---|---|---|
| | Naph. | Naph. | Naph. | Para. |
| Viscosity: | | | | |
| SSU/100° F | 1,870 | 490 | 5,512 | 153 |
| SSU/210° F | 84 | 57 | 201 | 44 |
| Aniline Pt., ° F | 177 | 216 | 252 | 219 |
| Carbon Type Analysis: | | | | |
| Paraffinic Carbon, percent | 41 | 55 | 61 | 69 |
| Naphthenic Carbon, percent | 40 | 43 | 28 | 31 |
| Aromatic Carbon, percent | 19 | 2 | 11 | 0 |

Carbon blacks which are conventionally used in rubber formulations may also be added to the blend of this invention. These include ISAF, HAF, FEF, SRF, ALS, EPC, and EPF blacks. Other conventional fillers such as silica and talc may also be added to the formulation.

In the present application, tackiness of the rubber was measured by the following method:

TACK TEST PROCEDURE

A low gauge square woven nylon fabric was calendered on one side with experimental compound (.022±.002″) A die cut sample, 6 x 1 inches, of the freshly calendered material was clamped in the jaws of an Instron tester set 4″ apart. The jaws were traversed to a separation equal to 2× the gauge of the sample minus 0.015 inch and immediately moved apart. This caused the fabric to fold, bringing the gum surfaces together with a constant compressive force, then to immediately be stripped apart. The force required to separate the sample was measured as the jaws traverse apart. "Dwell" tack was measured at 2″/min. separation and "grab" tack at 12″/min. separation.

Example 1

The rubber of this invention was blended with various additives in one internal mixer by the following procedure:

Time (Min.):        Add:
  0 _____ Black or mineral filler, oil, additives except for curing ingredients, polymer (in the stated order).
  2 _____ Dust down mixer.
  4 _____ Dump at 300° F.

Cool batch and add curing ingredients in Banbury mixer (2–3 minutes mix) or on a 2-roll mill.

The blended samples were then tested for tackiness with the results shown in Table I. It is to be noted that the Dwell Tack and Grab Tack of compound No. 1, which serves as the control, was inferior to the other compounds containing varying amounts and types of isobutylene polymers, particularly to the compound No. 1 employing Butyl rubber at the 30% (rubber hydrocarbon) level.

It is notable that these tack improvements are obtained without loss of cure state, as evidenced by lowered modulus and increased elongation. This contrasts with the change of these properties caused by conventional tackifying resins contained in compounds No. 5 and 6.

Example 2

In another experiment the compounds shown in Table II were prepared by the mixing procedure described in Example 1 and tested in a similar manner (the only difference being that the backing fabric in the tack test procedure was rayon instead of nylon). It will be noted that the Butyl or isobutylene containing compounds exhibit about twice the tack strength of the control compound (No. 1). The tack improvement produced by the Butyl-oil combination can be noted over the range of Butyl-concentrations from 10–50% (rubber hydrocarbon) which constitutes a range of 11–100 parts isobutylene polymer per 100 parts EPDM. Over the entire range of concentrations, the state of cure as indicated by modulus and particularly elongation is essentially unaffected.

The effectiveness of the straight isobutylene polymer (Vistanex L-120) is illustrated by compound No. 7.

Example 3

In conjunction with the experiment described in Example 2, the compounds shown in Table III were prepared and tested. Mixing and testing techniques were the same as in Example 2.

It will be noted that without a sufficient quantity of oil present (compound No. 1), the tack strength benefit of the invention is lost, compared to the higher oil level of

TABLE I

[Constant Ingredients: FEF Black, 90; Flexon 765 Oil, 70; Zinc Oxide, 5; Stearic Acid, 1; Sulfur, 1.5; TMTDS,* 1.5; MBT, 0.5]

| Compound No | 1 | 2 | 3 | 4 | 5 | 6 |
|---|---|---|---|---|---|---|
| Varied Ingredients: | | | | | | |
| EPT-3509 [1] | 100 | 70 | 100 | 100 | 100 | 100 |
| Butyl 268 [2] | | 30 | | | | |
| Vistanex L-120 [3] | | | 10 | 5 | | |
| Pine Tar | | | | | 10 | |
| Hydrogenated Wood Rosin | | | | | | 10 |
| Tack Strength, lbs./in.: | | | | | | |
| Dwell Tack, 2″/min | 0.5 | 1.8 | 0.9 | 0.7 | 0.1 | 0.0 |
| Grab Tack, 12″/min | 1.1 | 2.0 | 1.7 | 1.6 | 0.5 | 0.0 |
| Physical Properties: | | | | | | |
| 40 min./307° F. Cure: | | | | | | |
| Hardness, Shore "A" | 60 | 60 | 58 | 60 | 55 | 57 |
| 300%—Modulus, p.s.i | 1,260 | 1,090 | 1,140 | 1,060 | 690 | 875 |
| Tensile Strength, p.s.i | 2,000 | 1,725 | 2,025 | 1,850 | 2,040 | 2,040 |
| Elongation, Percent | 500 | 520 | 505 | 520 | 770 | 700 |

[1] A terpolymer of ethylene propylene and a minor amount of methylene norbornene having a Mooney viscosity (ML 260° F., 3 min. reading) of 57–67 and a diene level of 2–3 wt. percent.
[2] A copolymer of isobutylene and isoprene having a Mooney viscosity (ML 260° F., 3 min. reading) of 50–60 and an unsaturation level of 1.5–2.0 wt. percent.
[3] Polyisobutylene having a viscosity average molecular weight range of 99,000–117,000.
* Tetramethylthiuramdisulfide.

TABLE II

[Constant Ingredients: Zinc Oxide, 5; Stearic Acid, 1; Sulfur, 1.5; TMTDS, 1.5; MBT,* 0.5]

| Compound No | 1 | 2 | 3 | 4 | 5 | 6 | 7 |
|---|---|---|---|---|---|---|---|
| Varied Ingredients: | | | | | | | |
| EPT 3509 | 100 | 90 | 80 | 70 | 60 | 50 | 90 |
| Butyl 268 | | 10 | 20 | 30 | 40 | 50 | |
| Vistanex L-120 | | | | | | | 10 |
| FEF Black | 70 | 70 | 70 | 70 | 70 | 70 | 70 |
| Flexon 765 Oil | 90 | 90 | 90 | 90 | 90 | 90 | 90 |
| Tack Strength, lbs./in.: | | | | | | | |
| Dwell Tack (2″/min.) | .7 | 1.1 | 1.4 | 1.4 | 1.3 | 1.6 | 1.8 |
| Grab Tack (12″/min.) | 1.7 | 2.8 | 3.1 | 3.4 | 3.5 | 3.8 | 3.2 |
| Physical Properties: | | | | | | | |
| 40 Min./307° F. Cure: | | | | | | | |
| Hardness, Shore "A" | 62 | 61 | 60 | 59 | 58 | 58 | 60 |
| 300% Modulus, p.s.i | 1,110 | 1,010 | 990 | 950 | 920 | 850 | 1,000 |
| Tensile Strength, p.s.i | 1,850 | 1,710 | 1,640 | 1,580 | 1,489 | 1,410 | 1,560 |
| Elongation, Percent | 500 | 510 | 510 | 510 | 510 | 510 | 460 |

* Mercaptobenzothiazole.

compound No. 2. Compound No. 4 also exhibits low tack, having exceeded the limits of the oil and black content (in combination) for attainment of the tack strength benefit described by this invention.

TABLE III

[Constant Ingredients: Zinc Oxide, 5; Stearic Acid, 1; Sulfur, 1.5; TMTDS, 1.5; MBT, 0.5]

| Compound No. | 1 | 2 | 3 | 4 |
|---|---|---|---|---|
| Varied Ingredients: | | | | |
| EPT 3509 | 90 | 90 | 70 | 70 |
| Butyl 268 | 10 | 10 | 30 | 30 |
| FEF Black | 50 | 90 | 90 | 250 |
| Flexon 765 Oil | 20 | 70 | 70 | 150 |
| Tack Strength, lbs./in.: | | | | |
| Dwell Tack (2″/min.) | 0.7 | 1.1 | 1.4 | 0.4 |
| Grab Tack (12″/min.) | 1.2 | 2.9 | 3.4 | 1.2 |
| Physical Properties: | | | | |
| 40 min./307° F. Cure: | | | | |
| Hardness, Shore "A" | 66 | 61 | 59 | 79 |
| 300% Modulus, p.s.i. | 1,470 | 1,010 | 950 | |
| Tensile Strength, p.s.i. | 1,910 | 1,710 | 1,580 | 650 |
| Elongation, percent | 390 | 510 | 510 | 200 |

This invention has been described in connection with certain specific embodiments thereof; however, it should be understood that these are by way of example rather than by way of limitation and it is not intended that the invention be restricted thereby.

What is claimed is:

1. A rubbery composition of improved building tack comprising a blend of:
    (a) copolymer of ethylene and a $C_3$–$C_{12}$ alpha olefin;
    (b) about 5–100 parts per 100 parts of copolymer (a) of an at least semisolid material which is polyisobutylene, Butyl rubber, or mixtures thereof, said Butyl rubber being a copolymer of a major proportion of an isoolefin and a minor proportion of a multiolefin;
    (c) about 30–250 parts per 100 parts of copolymer (a) of a process oil.

2. The composition of claim 1 which additionally includes up to 500 parts of carbon black per 100 parts of copolymer (a).

3. The composition of claim 1 which contains 10–70 parts of copolymer (b).

4. The composition of claim 3 which contains 50–200 parts of petroleum oil.

5. The composition of claim 4 wherein the $C_3$–$C_{12}$ alpha olefin is propylene.

6. The composition of claim 5 wherein copolymer (a) is a terpolymer of ethylene, propylene and about 1–10 wt. percent of a nonconjugated diolefin.

7. The composition of claim 1 which contains about 10–70 parts of copolymer (b) and about 50–200 parts of process oil.

8. The composition of claim 7 which additionally includes 50–300 parts of carbon black.

9. The composition of claim 6 wherein the nonconjugated diolefin is methylene norbornene.

10. A process for improving the building tack of rubbery copolymers of ethylene and a $C_3$–$C_{12}$ alpha olefin which comprises blending said copolymer with about 5–100 parts of an at least semisolid material which is polyisobutylene or Butyl rubber, or mixtures thereof, said Butyl rubber being a copolymer of a major portion of an isoolefin and a minor portion of a multiolefin; and about 30–250 parts of a petroleum oil, all parts being based on 100 parts of the copolymer of ethylene and a $C_3$–$C_{12}$ alpha olefin.

11. The process of claim 10 wherein the $C_3$–$C_{12}$ alpha olefin is propylene.

References Cited

UNITED STATES PATENTS

| 2,875,170 | 2/1959 | Ayers et al. | 260—33.6 |
| 3,136,739 | 6/1964 | Adamek et al. | 260—33.6 |
| 3,278,480 | 8/1966 | Radcliff et al. | 260—897 |

OTHER REFERENCES

Rubber and Plastic Age, Ethylene Propylene Rubber, by L. O. Amberg and A. E. Robinson, July 1961, p. 875.

MORRIS LIEBMAN, *Primary Examiner.*

JULIUS FROME, *Examiner.*

SAMUEL L. FOX, *Assistant Examiner.*